United States Patent
Liu et al.

(10) Patent No.: US 9,112,929 B2
(45) Date of Patent: Aug. 18, 2015

(54) METHOD, APPARATUS AND SYSTEM FOR ACCESSING VIRTUAL PRIVATE NETWORK BY VIRTUAL PRIVATE CLOUD

(71) Applicant: Huawei Technologies Co., Ltd., Shenzhen (CN)

(72) Inventors: Ying Liu, Shenzhen (CN); Shihui Hu, Beijing (CN); Delei Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 309 days.

(21) Appl. No.: 13/656,375

(22) Filed: Oct. 19, 2012

(65) Prior Publication Data

US 2013/0110993 A1    May 2, 2013

(30) Foreign Application Priority Data

Oct. 21, 2011    (CN) .......................... 2011 1 0323657

(51) Int. Cl.
G06F 15/177    (2006.01)
H04L 29/08    (2006.01)
H04L 12/46    (2006.01)

(52) U.S. Cl.
CPC ............ H04L 67/34 (2013.01); H04L 12/4641 (2013.01); H04L 29/08981 (2013.01)

(58) Field of Classification Search
CPC ..................... H04L 12/2424; H04L 29/08981; H04L 67/34
USPC ............................................ 709/220; 726/15
See application file for complete search history.

(56) References Cited

U.S. PATENT DOCUMENTS

| 7,653,056 B1 | 1/2010 | Dianes et al. |
| 2008/0101390 A1 | 5/2008 | Hu |

(Continued)

FOREIGN PATENT DOCUMENTS

| CN | 1913523 A | 2/2007 |
| CN | 101841451 A | 9/2010 |

(Continued)

OTHER PUBLICATIONS

Timothy Wood, Prashant Shenoy, Alexandre Gerber, K.K. Ramakrisshnan, Jacobus Van der Merwe (The Case for Enterprise-Ready Virtual Private Clouds; University of Massachusetts Amherst and AT&T Labs-Research; 2009.*

(Continued)

*Primary Examiner* — Yves Dalencourt
(74) *Attorney, Agent, or Firm* — Brinks Gilson & Lione (57) ABSTRACT

Embodiments of the present invention disclose a method, an apparatus and a system for accessing a virtual private network by a virtual private cloud. A data center breakout gateway receives first configuration information; creates a first VPN instance according to identifier information of the VPN; determines VPC according to parameter information of the VPC, and binds the VPC to the first VPN instance; and sends second configuration information to the network side PE according to address information of the network side PE, where the second configuration information includes the identifier information of the VPN, so that the network side PE configures an upper layer VPN instance for the first VPN instance on the network side PE according to the identifier information of the VPN. In the embodiments of the present invention, the problem of automatically accessing the virtual private network by the virtual private cloud is solved.

15 Claims, 7 Drawing Sheets

(56) References Cited

U.S. PATENT DOCUMENTS

| | | |
|---|---|---|
| 2010/0318609 A1 | 12/2010 | Lahiri et al. |
| 2011/0142053 A1 | 6/2011 | Van Der Merwe et al. |
| 2011/0231899 A1* | 9/2011 | Pulier et al. .................. 726/1 |
| 2013/0166705 A1* | 6/2013 | Flavel et al. ................ 709/220 |

FOREIGN PATENT DOCUMENTS

| | | |
|---|---|---|
| CN | 101986274 A | 3/2011 |
| CN | 102387061 A | 3/2012 |
| EP | 2228968 A2 | 9/2010 |

OTHER PUBLICATIONS

Extended European Search Report issued in corresponding European Patent Application No. 12189242.6, mailed Feb. 19, 2013.

International Search Report issued in corresponding PCT Patent Application No. PCT/CN2012/083277, mailed Dec. 27, 2012.

\* cited by examiner

METHOD, APPARATUS AND SYSTEM FOR ACCESSING VIRTUAL PRIVATE NETWORK BY VIRTUAL PRIVATE CLOUD

CROSS-REFERENCE TO RELATED APPLICATIONS

This application claims priority to Chinese Patent Application No. 201110323657.8, filed on Oct. 21, 2011, which is hereby incorporated by reference in its entirety.

FIELD OF THE INVENTION

The present invention relates to the field of data communications, and in particular, to a method, an apparatus and a system for accessing a virtual private network by a virtual private cloud.

BACKGROUND OF THE INVENTION

With popularity of data centers, users do not need to buy devices by themselves or deploy their own IT centers. Users may apply for a group of IT resources from a data center to provide them with cloud computing services. The IT resources are managed by the data center. Hardware resources in the data center provide cloud services for the users in the form of virtual devices. For example, if an enterprise applies for N servers, the data center does not physically dispatch N servers for the user, but virtualizes from the hardware resources N servers for the enterprise according to user's requirements on, for example, CPU, memory, and hard disk size, for the servers. These virtual servers, that is, the resources applied for by the user, form a virtual private cloud.

The user desires that the VPC created in the data center accesses the user's VPN so that the enterprise user securely accesses the resources in the VPC. A network side PE and a data center gateway form a hierarchy of PE (HoPE) and the VPC access is implemented in hierarchy of VPN (HoVPN) mode. The use of HoVPN brings the following advantages: In one aspect, the network side is capable of preventing exposure of unnecessary internal network topologies to the data center gateway; in another aspect, the VPN routing pressure of the data center gateway is reduced. According to the VPC access method using the existing HoVPN mode, an operator needs to manually create an upper layer VPN instance and a first VPN instance on the network side PE and the data center gateway respectively. During dynamic creation and cancellation of the VPC, a binding relationship between the VPC and the VPN may also dynamically change. Consequently, according to the existing VPC access method by manually setting the HoVPN mode, the time cost and economic cost are high. The present invention provides a method for automatic access and cancellation of the VPC in HoVPN mode.

SUMMARY OF THE INVENTION

Embodiments of the present invention provide a method, an apparatus and a system for accessing a virtual private network by a virtual private cloud, capable of implementing automatic access to the VPN by the VPC.

In one aspect, an embodiment of the present invention provides a method for accessing a virtual private network by a virtual private cloud. The method includes:
receiving first configuration information, where the first configuration information includes parameter information of the virtual private cloud (VPC), identifier information of the virtual private network (VPN), and address information of a network side provider edge (PE);
creating a first VPN instance according to the identifier information of the VPN;
determining the VPC according to the parameter information of the VPC, and binding the VPC to the first VPN instance; and
sending second configuration information to the network side PE according to the address information of the network side PE, where the second configuration information includes the identifier information of the VPN, so that the network side PE configures an upper layer VPN instance for the first VPN instance on the network side PE according to the identifier information of the VPN.

In another aspect, an embodiment of the present invention provides an apparatus for accessing a virtual private network by a virtual private cloud. The apparatus includes:
a receiving unit, adapted to receive first configuration information, where the first configuration information includes parameter information of the virtual private cloud (VPC), identifier information of the virtual private network (VPN), and address information of a network side provider edge (PE);
a creating unit, adapted to create a first VPN instance according to the identifier information of the VPN;
a binding unit, adapted to determine the VPC according to the parameter information of the VPC, and bind the VPC to the first VPN instance; and
a configuring unit, adapted to send second configuration information to the network side PE according to the address information of the network side PE, where the second configuration information includes the identifier information of the VPN, so that the network side PE configures an upper layer VPN instance for the first VPN instance on the network side PE according to the identifier information of the VPN.

In still another aspect, an embodiment of the present invention provides a network system. The system includes the apparatus for accessing a virtual private network by a virtual private cloud.

According to the method, apparatus and system for accessing a virtual private network by a virtual private cloud provided in the embodiments of the present invention, an upper VPN instance is configured for the first VPN instance on the network side PE, and accordingly a VPN connection is established between the first VPN instance and the upper layer VPN instance. Further, because the VPC has been bound to the first VPN instance, the VPC automatically accesses the VPN corresponding to the identifier information of the VPN. Therefore, the access requires no manual configuration, reducing a large amount of time cost and economic cost.

The following describes the technical solutions of embodiments of the present invention in combination with the accompanying drawings and embodiments.

DETAILED DESCRIPTION OF THE EMBODIMENTS

Figure 1:
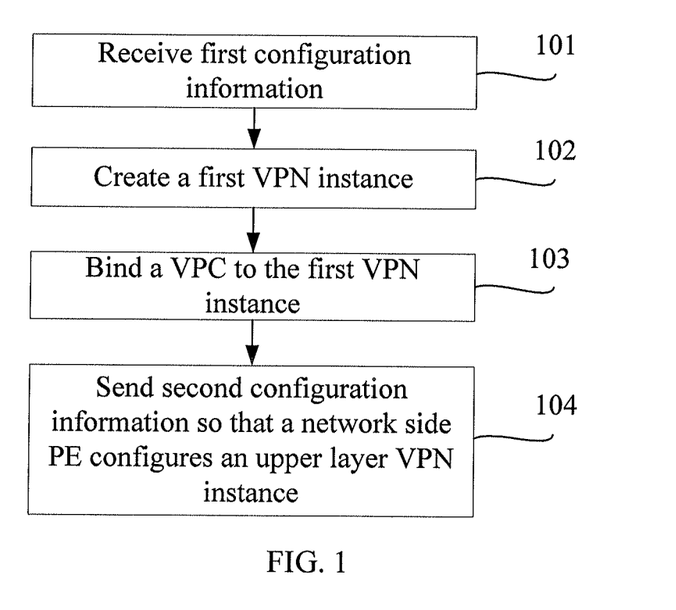
FIG. 1 is a flowchart of a method for accessing a virtual private network by a virtual private cloud according to an Embodiment 1 of the present invention.

FIG. 1 is a flowchart of a method for accessing a virtual private network by a virtual private cloud according to an Embodiment 1 of the present invention. As shown in FIG. 1, the Embodiment 1 of the present invention includes the following content.

Step 101: Receive first configuration information.

Preferably, a data center (DC) breakout gateway receives the first configuration information, where the first configuration information includes parameter information of the virtual private cloud (VPC), identifier information of the virtual private network (VPN), and address information of a network side provider edge (PE). Preferably, the first configuration information is sent by a cloud manager. Preferably, the DC breakout gateway is a VPN routing device.

Step 102: Create a first VPN instance according to the identifier information of the VPN.

After receiving the first configuration information, the DC breakout gateway creates the first VPN instance according to the identifier information of the VPN. Preferably, the first VPN instance is created by a VPN instance proxy in the DC breakout gateway.

Step 103: Determine the VPC according to the parameter information of the VPC, and bind the VPC to the first VPN instance.

Preferably, after receiving the first configuration information, the DC breakout gateway further creates a subinterface, and binds the VPC to the first VPN instance by using the subinterface.

Step 104: Send second configuration information to the network side PE according to the address information of the network side PE, where the second configuration information includes the identifier information of the VPN, so that the network side PE configures an upper layer VPN instance for the first VPN instance on the network side PE according to the identifier information of the VPN.

Preferably, the upper layer VPN instance forwards to the first VPN instance a VPN packet received from another PE except the DC breakout gateway where the first VPN is located.

Preferably, the configuring, by the network side PE, the upper layer VPN instance for the first VPN instance on the network side PE according to the identifier information of the VPN includes:

configuring, by the network side PE, the upper layer VPN instance on the network side PE according to the VSI ID; or creating, by the network side PE, the upper layer VPN instance on the network side PE according to the VPN RT, and delivering a default route of the upper layer VPN instance to the DC breakout gateway where the first VPN is located, where the network side PE is a Multiprotocol Boarder Gateway Protocol (MP-BGP) peer of the DC breakout gateway where the first VPN is located.

Preferably, the method further includes: receiving, by the DC breakout gateway, deletion information for the VPC and deleting the VPC. The DC breakout gateway may further delete the first VPN instance and instructs the network side PE to cancel configuration of the upper layer VPN instance.

Preferably, when a VPN instance corresponding to the identifier information of the VPN already exists before the network side PE receives the second configuration information, the configuring the upper layer VPN for the first VPN instance is configuring the existing VPN instance corresponding to the identifier information of the VPN as the upper layer VPN instance.

Preferably, when a VPN instance corresponding to the identifier information of the VPN does not exist before the network side PE receives the second configuration information, the configuring the upper layer VPN for the first VPN instance is creating a new VPN instance corresponding to the identifier information of the VPN, and configuring the created VPN instance as the upper layer VPN instance. In this embodiment, the process of creating a new VPN instance and configuring the new VPN may be understood as a configuration process.

Preferably, as regard a virtual private local area network service (VPLS), the identifier information of the VPN is a virtual switching instance (VSI ID). Preferably, as regard the layer 3 (L3) VPN, the identifier information of the VPN is a VPN route target (RT). After receiving the second configuration information, the network side PE configures an upper layer VPN instance for the first VPN instance on the network side PE according to the identifier information of the VPN.

After the upper layer VPN instance is configured for the first VPN instance on the network side PE, a VPN connection is established between the first VPN instance and the upper layer VPN instance. Further, because the VPC has been bound to the first VPN instance, the VPC automatically accesses the VPN corresponding to the identifier information of the VPN.

Preferably, in the Embodiment 1 of the present invention, the DC breakout gateway may send the second configuration information to the network side PE based on the Label Distribution Protocol (LDP).

A specific alternative method includes the following content:

The VPN instance proxy of the DC breakout gateway sends the second configuration information to an LDP protocol module in the DC breakout gateway after creating the first VPN instance. The second configuration information includes the identifier information of the VPN. For example, the second configuration information includes the VSI ID. The second configuration information is carried in a vendor-private (vendor-private) message over the Label Distribution Protocol (LDP). Table 1 shows the format of the vendor-private message.

TABLE 1

| U | Message type | Message length |
|---|---|---|
| Message ID (defining new type) | | |
| Vendor ID | | |
| VSI ID | | |

U indicates an unknown information bit. Message type (Message type) indicates a type of the message, including notification (Notification), hello (Hello), initialization (Initialization), keep alive (Keep Alive), address (Address), address withdraw (Address Withdraw), label request (Label Request), label withdraw (Label Withdraw), label release (Label Release), and unknown message (Unknown Message). Message length (Message length) indicates the total bytes of the message type, mandatory parameters, and optional parameters, 8 bits in length. Message ID (Message ID) is a 32-bit value, used for indicating a message type of a message. Vendor ID (Vendor ID) indicates an ID of a hardware vendor. Generally, each vendor has a unique Vendor ID. Virtual switching instance identifier (VSI ID) is a configuration parameter required for configuring a second VPN instance.

After receiving the vendor-private message, the LDP protocol module in the network side PE obtains a loopback address of the DC breakout gateway from local connection information for transmitting the second configuration information. The LDP protocol module in the network side PE sends the identifier information of the VPN in the second configuration information and the loopback address of the DC breakout gateway to the VPN instance proxy in the network side PE for configuring the upper layer VPN instance for the first VPN instance.

Alternatively, in the Embodiment 1 of the present invention, the DC breakout gateway may send the second configuration information to the network side PE based on the Boarder Gateway Protocol (LDP). A specific alternative method includes the following content:

The VPN instance proxy of the DC breakout gateway sends the second configuration information to a BGP protocol module in the DC breakout gateway after creating the first VPN instance. The second configuration information includes the identifier information of the VPN. For example, the second configuration information includes the VSI ID. The second configuration information is carried in an update (Update) message over the Boarder Gateway Protocol (BGP). The path attribute (Path Attribute) field in the Update message is extended.

The path attribute field may be extended using multiple methods. One alternative method is as follows:

A new Path Attribute type is added in the Update message, for specifically bearing the second configuration information. Table 2 shows the format of the Update message to which the new Path Attribute type is added.

TABLE 2

| Withdrawn routes length | | | | | | |
|---|---|---|---|---|---|---|
| Withdrawn routes | Option | Transitive | Partial | Extended len | 0 0 0 0 | |
| Total path attribute length | Type (defining a new type) | | | | | |
| Path attribute | Attribute length | | | | | |
| NLRI | VSI ID | | | | | |

Withdrawn routes length (Withdrawn routes length): indicates the length of the routes that need to be withdrawn.

Withdrawn routes (Withdrawn routes): indicates the routes that need to be withdrawn; if no route needs to be withdrawn, this field does not exist; if there are routes that need to be withdrawn, this field lists the routes to be withdrawn in detail.

Total path attribute length (Total path attribute length): indicates the total length of the path attribute.

Path attribute (Path attribute): indicates an attribute of a path. The format is attribute <type, length, value> (attrib <T, L, V>), where T indicates the type, L indicates the length, and V indicates the value.

Type (Type) in the path attribute: has one byte in length, and is used for indicating whether the Update message bears information for configuring an upper layer VPN instance or information for deleting an upper layer VPN instance.

Attribute length in the path attribute: indicates the length of the value attribute in the path attribute in the TLV format.

Value in the path attribute: indicates the specific value of the value attribute in the path attribute in the TLV format; in Table 2, this field is represented by a specific value of a VSI ID.

Network layer reachability information (NLRI): indicates a prefix of a reachable route and a 2-tuple of the prefix length, where NLRI is an abbreviation for network layer reachability information (Network Layer Reachability Information).

Another alternative method is as follows:

A new sub-address family identifier (SAFI) is added to the multiprotocol reachable network layer reachability information attribute (MP_REACH_NLRI attribute) in the Update message to bear the information for configuring an upper layer VPN instance or bear the information for deleting an upper layer VPN instance. Table 3 shows the format of the message.

TABLE 3

| Option | Transitive | Partial | Extended len | 0 0 0 0 |
|---|---|---|---|---|
| Type | | | | |
| Attribute length | | | | |
| Address Family Identifier | | | | |
| Subsequence Address Family Identifier (defining a new type) | | | | |
| Length of next hop network address | | | | |
| Network address of next hop: carrying VSI ID | | | | |

Table 3 shows extended multiprotocol reachable network layer reachability information (MP_REACH_NLRI), for bearing the information for configuring an upper layer VPN instance or bearing the information for deleting an upper layer VPN instance.

Address family identifier (Address Family Identifier, AFI) is used to carry the identifier of a connection between a network layer protocol and a network address.

Subsequence address family identifier (Subsequence Address Family Identifier, SAFI) is used to carry supplementary information of the type of the network layer reachability information (NLRI) included in the attribute.

Length of next hop address (Length of next hop network address) is used to identify the length of a next hop network address.

Network address of next hop (Network address of next hop): The length of this field is variable. In this embodiment, this field does not carry the address information but is used to carry the VSI ID.

Attributes of the SAFI, length of next hop address, and network address of next hop form an attribute in the format of type-length-value.

Figure 2:
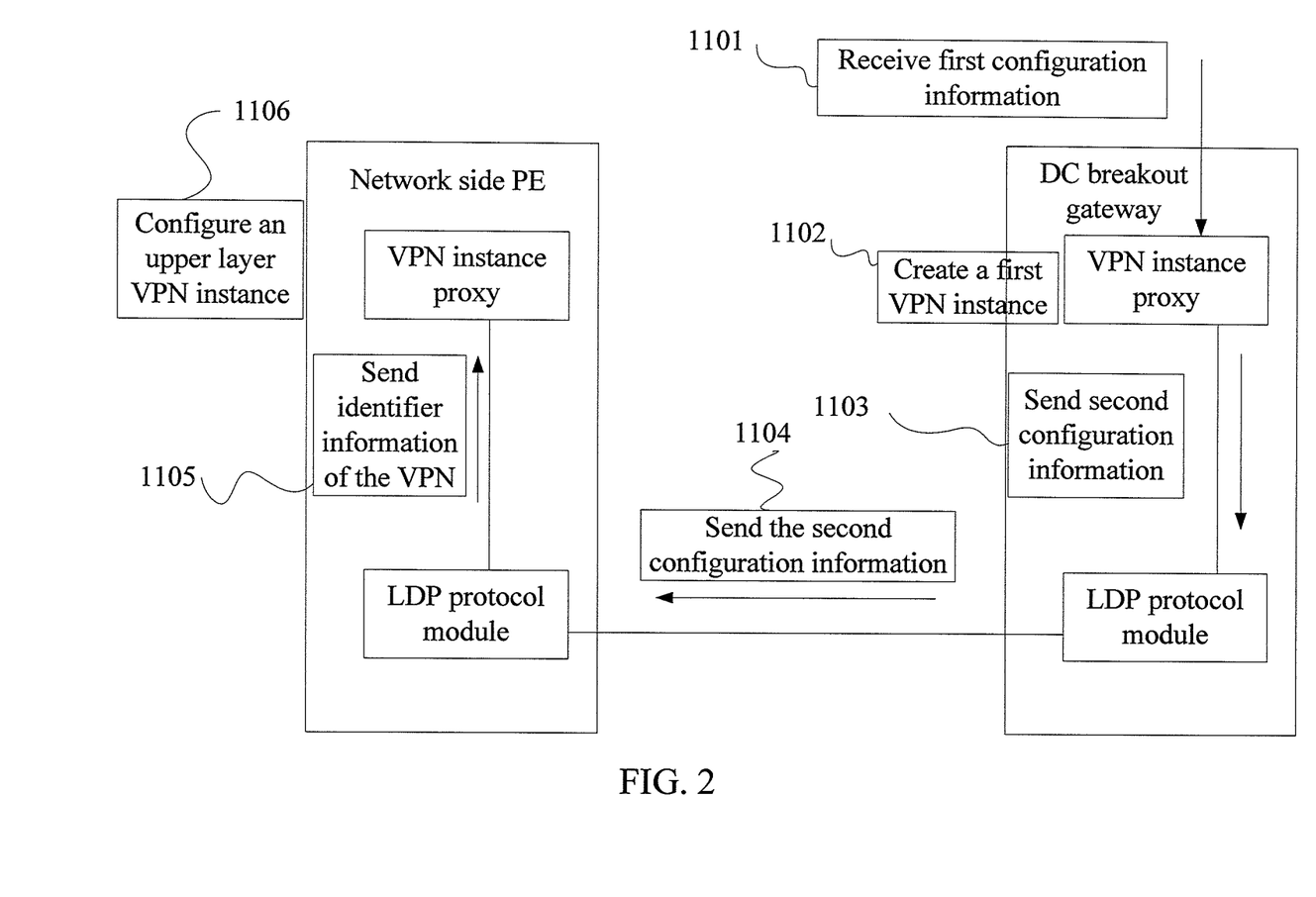
FIG. 2 is a schematic diagram of a process of sending configuration information to a network side PE based on the Label Distribution Protocol (LDP) by a DC breakout gateway and a process of processing the configuration information by the network side PE according to the Embodiment 1 of the present invention.

FIG. 2 is a schematic diagram of a process of sending configuration information to a network side PE based on the Label Distribution Protocol (LDP) by a DC breakout gateway and a process of processing the configuration information by the network side PE according to the Embodiment 1 of the present invention. As shown in FIG. 2, the process of sending configuration information to a network side PE based on the Label Distribution Protocol (LDP) by a DC breakout gateway and the process of processing the configuration information by the network side PE according to the Embodiment 1 of the present invention includes the following content:

Step 1101: The DC breakout gateway receives the first configuration information through its interface.

Step 1102: A VPN instance proxy in the DC breakout gateway creates the first VPN instance according to the first configuration information.

Step 1103: The VPN instance proxy in the DC breakout gateway sends the second configuration information to an LDP protocol module in the DC breakout gateway. Alternatively, the second configuration information includes the identifier information of the VPN, for example, the VSI ID.

Step 1104: The LDP protocol module in the DC breakout gateway sends the second configuration information to the network side PE. The second configuration information is carried in the vendor-private (vendor-private) message, which is shown in Table 1.

Step 1105: After receiving the second configuration information, the LDP protocol module in the network side PE sends the identifier information of the VPN to the VPN instance proxy in the network side PE.

Step 1106: The VPN instance proxy in the network side PE configures an upper layer VPN instance for the first VPN instance on the network side PE according to the identifier information of the VPN.

Figure 3:
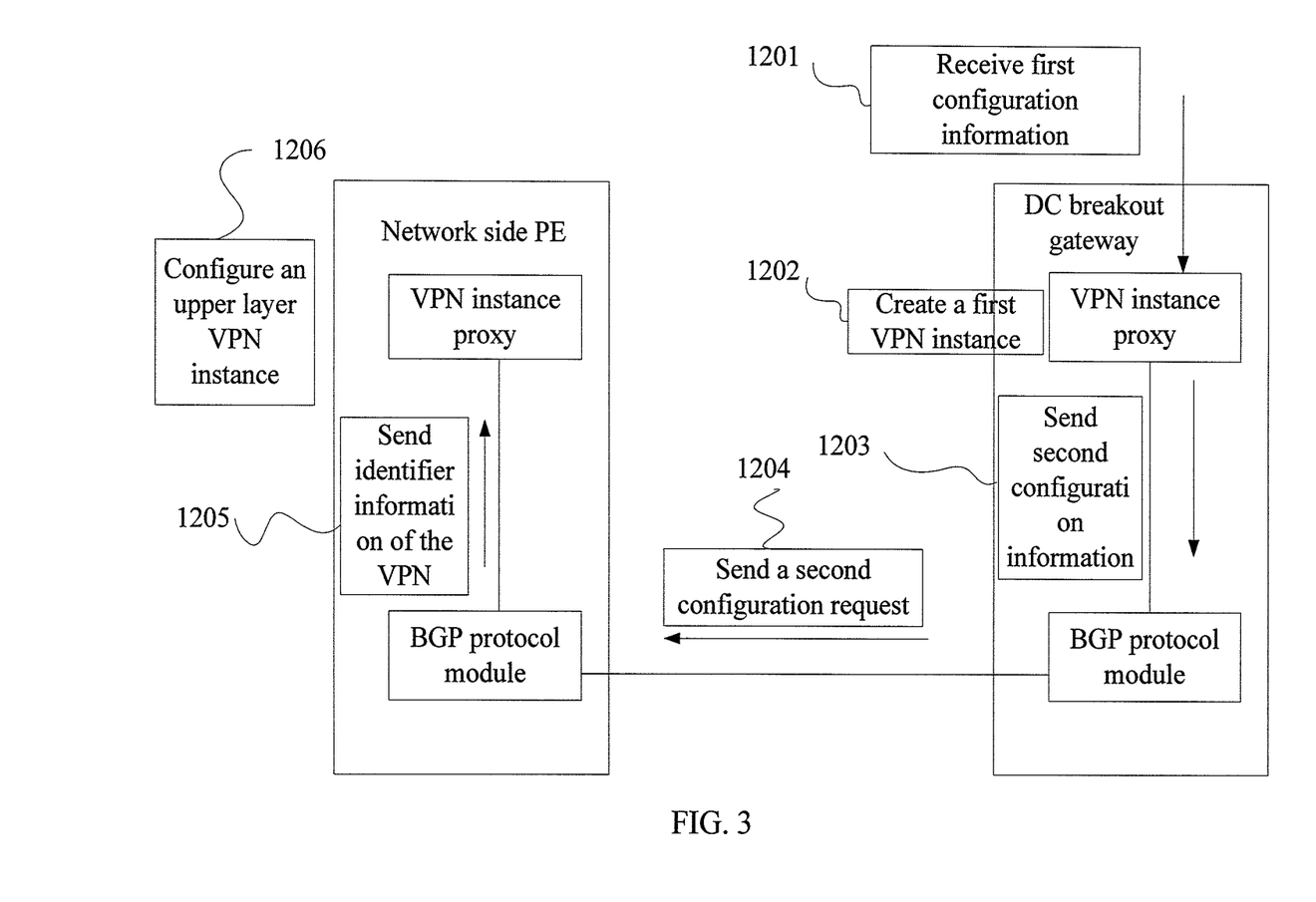
FIG. 3 is a schematic diagram of a process of sending configuration information to a network side PE based on the Boarder Gateway Protocol (BGP) by a DC breakout gateway and a process of processing the configuration information by the network side PE according to the Embodiment 1 of the present invention.

FIG. 3 is a schematic diagram of a process of sending configuration information to a network side PE based on the Boarder Gateway Protocol (BGP) by a DC breakout gateway and a process of processing the configuration information by the network side PE according to the Embodiment 1 of the present invention. As shown in FIG. 3, the process of sending configuration information to a network side PE based on the Boarder Gateway Protocol (BGP) by a DC breakout gateway and the process of processing the configuration information by the network side PE according to the Embodiment 1 of the present invention includes the following content:

Step 1201: The DC breakout gateway receives the first configuration information through its interface.

Step 1202: A VPN instance proxy in the DC breakout gateway creates the first VPN instance according to the first configuration information.

Step 1203: The VPN instance proxy in the DC breakout gateway sends the second configuration information to a BGP protocol module in the DC breakout gateway. Optionally, the second configuration information includes the identifier information of the VPN, for example, the VSI ID.

Step 1204: The BGP protocol module in the DC breakout gateway sends the second configuration information to the network side PE. The second configuration information is carried in an extended Update message. For example, the Update message is extended according to the method shown in Table 2 or Table 3 to carry the second configuration information.

Step 1205: After receiving the second configuration information, the BGP protocol module in the network side PE sends the identifier information of the VPN to the VPN instance proxy in the network side PE.

Step 1206: The VPN instance proxy in the network side PE configures an upper layer VPN instance for the first VPN instance on the network side PE according to the identifier information of the VPN.

Figure 4:
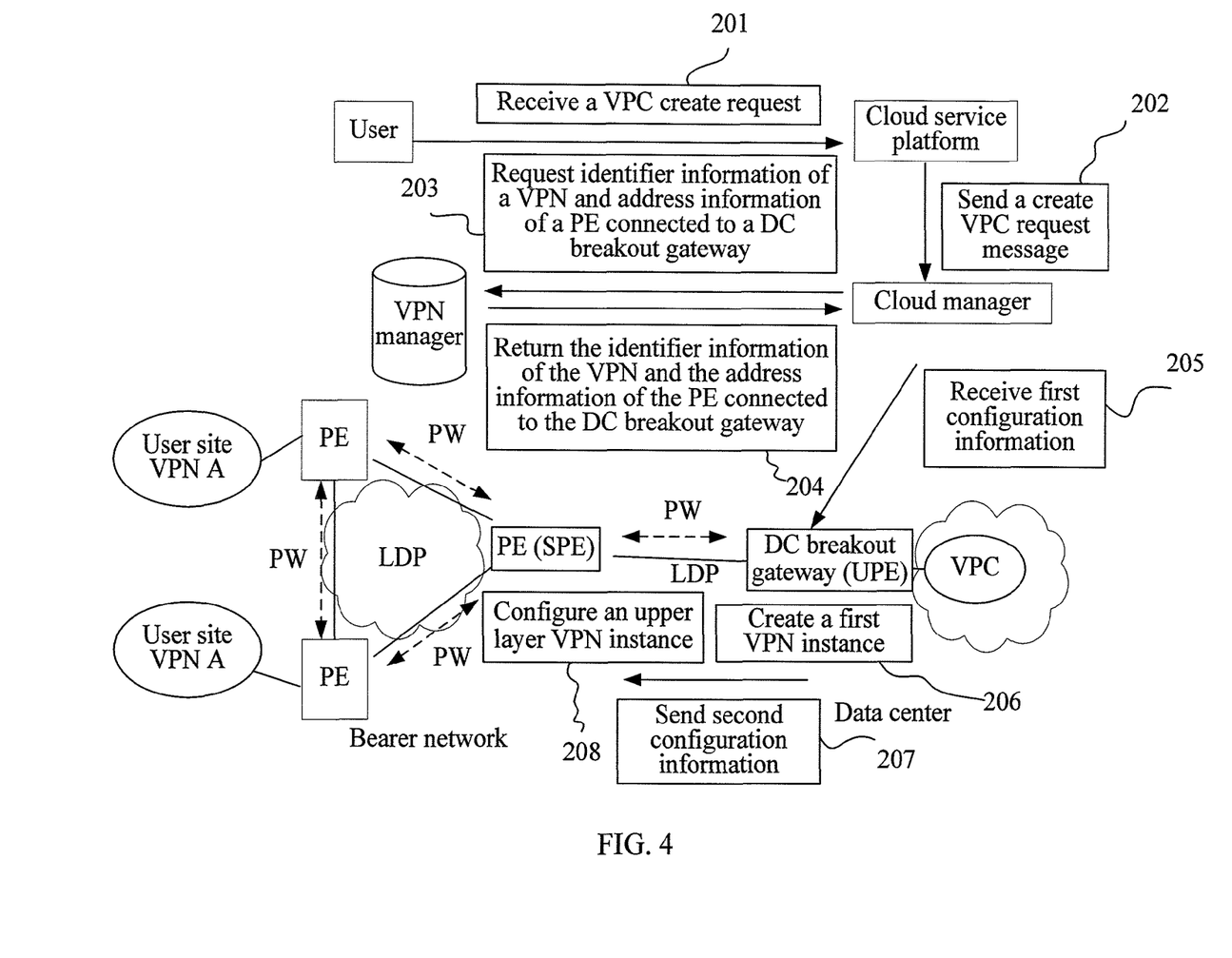
FIG. 4 is a network architecture diagram of accessing a virtual private local area network (VPLS) by a virtual private cloud according to an Embodiment 2 of the present invention.

FIG. 4 is a network architecture diagram of accessing a virtual private local area network (VPLS) by a virtual private cloud according to an Embodiment 2 of the present invention. As shown in FIG. 4, the Embodiment 2 of the present invention includes the following content:

Step 201: A cloud service platform receives a VPC create request.

A data center and a network are provided by the same operator. A user logs in to a Web interface of the cloud service platform of the data center, and initiates the VPC create request on the cloud service platform. The VPC create request includes: parameter information of the VPC, and an identifier of a bearer network accessed by a network side VPN site, for example, a name of the bearer network; and further includes a VPN name. The VPN name is expressed by a natural language that is easily recognizable for the user, for example, Chinese or English.

Step 202: The cloud service platform delivers a request message for creating VPC to a cloud manager.

Preferably, after receiving the VPC create request sent by the user, the cloud service platform delivers the request message for creating VPC to the cloud manager. The request message for creating VPC carries information including: the parameter information of the VPC, the VPN name, and the identifier of the bearer network accessed by a network side VPN site.

Step 203: The cloud manager requests obtaining identifier information of the VPN from the VPN manager based on the VPN name. The identifier information of the VPN is expressed by an integer or a string that is easily recognizable for a network device. The cloud manager further requests from the VPN manager the address information of the network side PE connected to the DC breakout gateway in the data center where the cloud manager is located.

Preferably, a VPLS configuration table of the VPN manager stores a corresponding relationship between the VPN name and the identifier information of the VPN. A data center (DC) physical location table of the VPN manager stores a mapping relationship between the address information of the network side PE connected to the DC breakout gateway and the identifier of the cloud manager.

Step 204: The VPN manager returns to the cloud manager the identifier information of the VPN and the address information of the network side PE connected to the DC breakout gateway.

Preferably, in the VPLS configuration table of the VPN manager, the identifier information of the VPN is searched for according to the VPN name to obtain the identifier information of the VPN corresponding to the VPN name. The identifier information of the VPN may be the VSI ID. The VPN manager obtains the identifier of the data center where the cloud manager is located according to the request of the cloud manager, and searches, according to the identifier of the data center where the cloud manager is located, the DC physical location table for the address information of the network side PE connected to the DC breakout gateway in the data center where the cloud manager is located. Alternatively, the address information of the network side PE may be a loopback (loopback) address of the network side PE. Preferably, the VSI ID and the loopback address of the network side PE are returned to the cloud manager.

Tables 4 and 5 are a VPLS configuration table and a DC physical location table.

TABLE 4

| VPN identifier | VSI ID |
| --- | --- |

TABLE 5

| DC identifier | PE loopback address |
| --- | --- |

Step 205: The DC breakout gateway receives first configuration information sent by the cloud manager. The first configuration information includes the identifier information of the VPN and the address information of the network side PE, and preferably further includes the parameter information of the VPC. The identifier information of the VPN is the VSI ID, and the address information of the network side PE is the loopback address of the network side PE.

Step 206: After receiving the first configuration information sent by the cloud manager, the DC breakout gateway creates a first VPN instance. Further, the DC breakout gateway further binds the VPC created according to the request message for creating VPC to the first VPN instance.

Step 207: The DC breakout gateway sends second configuration information to the network side PE according to the address information of the network side PE, where the second configuration information includes the identifier information of the VPN, so that the network side PE configures an upper layer VPN instance for the first VPN instance on the network side PE according to the identifier information of the VPN.

Step 208: The network side PE configures an upper layer VPN instance for the DC breakout gateway on the network side PE. After receiving the second configuration information, the network side PE extracts a gateway IP address of the DC breakout gateway, and configures the upper layer VPN instance for the DC breakout gateway on the network side PE. In this way, a VPN connection is established between the first VPN instance and the upper layer VPN instance. Further, because the VPC has been bound to the first VPN instance, the VPC automatically accesses the VPN corresponding to the identifier information of the VPN, that is, the VPN corresponding to the VPN name.

The network side PE is a VPN routing device.

Figure 5:
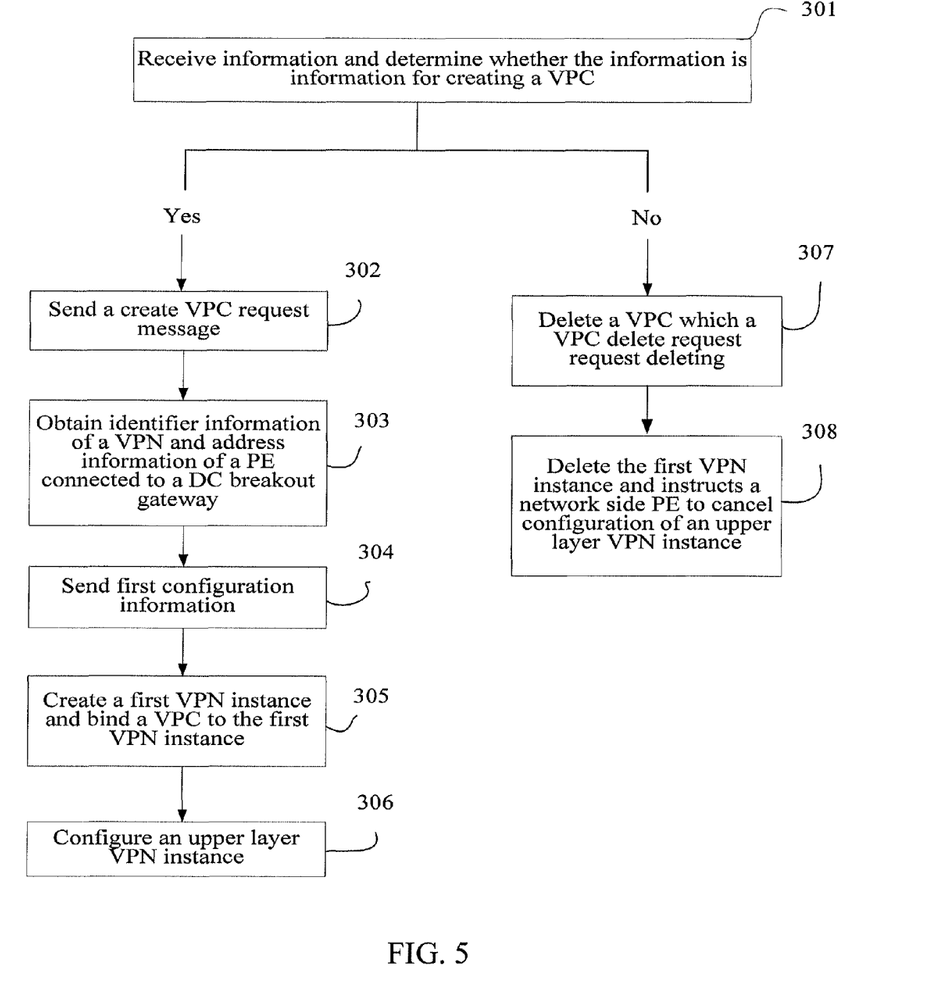
FIG. 5 is a flowchart of a method for accessing a virtual private local area network service (VPLS) by a virtual private cloud according to an Embodiment 3 of the present invention.

FIG. 5 is a flowchart of a method for accessing a virtual private local area network service (VPLS) by a virtual private cloud according to an Embodiment 3 of the present invention. As shown in FIG. 5, the method according to the Embodiment 3 of the present invention includes the following content:

Step 301: A cloud service platform receives information and determines whether the information is a VPC create request or a VPC delete request. If the cloud service platform receives a VPC create request, step 302 is performed; if the cloud service platform receives a VPC delete request, step 307 is performed.

Step 302: The cloud service platform delivers a request message for creating VPC to a cloud manager, where the request message for creating VPC carries information includes: parameter information of the VPC, a VPN name, and an identifier of a bearer network accessed by a network side VPN site.

Step 303: After receiving the request message for creating VPC sent by the cloud service platform, the cloud manager sends a request for obtaining identifier information of the VPN to a network side VPN manager, where the request for obtaining the identifier information of the VPN carries the VPN name.

The VPN manager searches a VPLS configuration table of the VPN manager for the identifier information of the VPN according to the VPN name, and obtains the identifier information of the VPN corresponding to the VPN name, for example, obtains the VSI ID.

The VPN manager searches a DC physical location table according to an identifier of the cloud manager, and determines address information of a network side PE connected to a DC breakout gateway in a data center, for example, a loopback address of the network side PE.

The VPN manager returns the VSI ID and the loopback address of the network side PE to the cloud manager.

Step 304: The cloud manager sends first configuration information to the DC breakout gateway, where the first configuration information includes the VSI ID and the loopback address of the network side PE, and further includes the parameter information of the VPC.

Step 305: The DC breakout gateway creates a first VPN instance. The DC breakout gateway further binds the VPC created according to the request message for creating VPC to the first VPN instance.

Step 306: The network side PE configures an upper layer VPN instance for the first VPN instance on the network side PE.

After receiving the second configuration information, the network side PE extracts a gateway IP address of the DC breakout gateway, configures a second VPN instance in the network side PE, and specifies, in the second VPN instance, the DC breakout gateway as a lower layer PE of the second VPN instance. In this way, the second VPN instance becomes the upper layer VPN instance of the first VPN instance.

In this way, a VPN connection is established between the first VPN instance and the upper layer VPN instance. Further, because the VPC has been bound to the first VPN instance, the VPC automatically accesses the VPN corresponding to the identifier information of the VPN, that is, the VPN corresponding to the VPN name.

Step 307: Delete the VPC which a VPC delete request requests deleting.

Step 308: The DC breakout gateway deletes the first VPN instance and instructs the network side PE to cancel configuration of the upper layer VPN instance.

Figure 6:
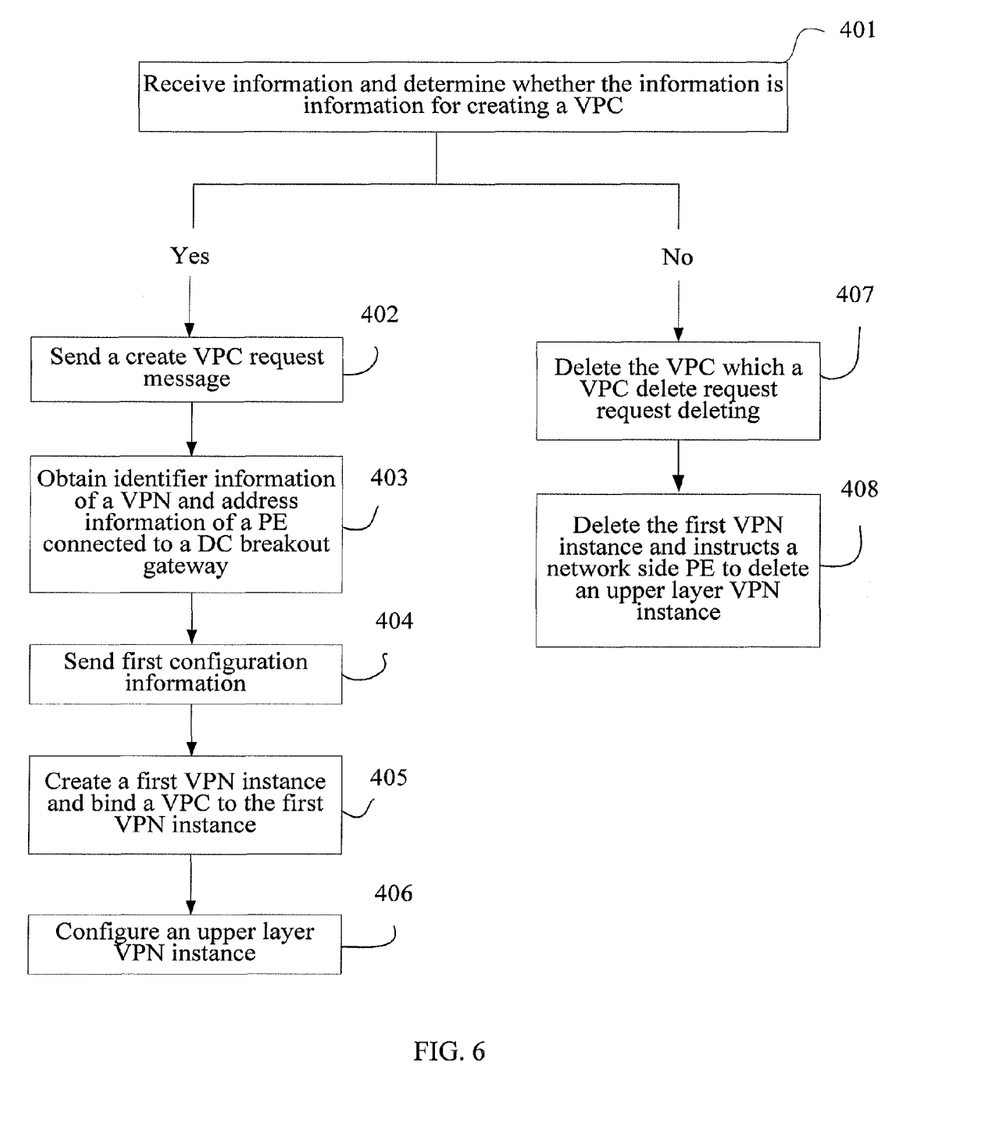
FIG. 6 is a flowchart of a method for accessing a layer 3 virtual private network by a virtual private cloud according to an Embodiment 4 of the present invention.

FIG. 6 is a flowchart of a method for accessing a layer 3 virtual private network by a virtual private cloud according to an Embodiment 4 of the present invention. As shown in FIG. 6, the method according to the Embodiment 4 of the present invention includes the following content:

Step 401: A cloud service platform receives information and determines whether the information is a VPC create request or a VPC delete request. If the cloud service platform receives a VPC create request, step 402 is performed; if the cloud service platform receives a VPC delete request, step 407 is performed.

Step 402: The cloud service platform delivers a request message for creating VPC to a cloud manager, where the request message for creating VPC carries information includes: parameter information of the VPC, a VPN name, and an identifier of a bearer network accessed by a network side VPN site.

Step 403: After receiving the request message for creating VPC sent by the cloud service platform, the cloud manager sends a request for obtaining identifier information of the VPN to a network side VPN manager, where the request for obtaining the identifier information of the VPN carries the VPN name.

In a VPN configuration table of the VPN manager, VPN configuration parameters are searched for according to the VPN identifier to obtain the identifier information of the VPN corresponding to the VPN name, for example, obtain VPN RT information. The VPN manager searches a DC physical location table according to an identifier of the cloud manager, and determines address information of a network side PE connected to a DC breakout gateway in a data center, that is, a loopback address of the network side PE.

The VPN manager returns the VPN RT and the loopback address of the network side PE to the cloud manager.

Step 404: The cloud manager sends first configuration information to the DC breakout gateway, where the first configuration information includes the VPN RT, and the loopback address of the network side PE.

Step 405: The DC breakout gateway creates a first VPN instance. The DC breakout gateway further binds the VPC created according to the request message for creating VPC to the first VPN instance.

Step 406: The network side PE configures an upper layer VPN instance for the first VPN instance on the network side PE.

The network side PE receives a request for configuring an upper layer VPN instance sent by the DC breakout gateway. The request for configuring an upper layer VPN instance carries the VPN RT. The network side PE configures a second VPN instance according to the VPN RT. In addition, the network side PE sends a default route of the first VPN instance to the DC breakout gateway; and a next hop of the default route is the network side PE. In this way, the second VPN instance becomes the upper layer VPN instance of the first VPN instance.

In this way, a VPN connection is established between the first VPN instance and the upper layer VPN instance. Further, because the VPC has been bound to the first VPN instance, the VPC automatically accesses the VPN corresponding to the identifier information of the VPN, that is, the VPN corresponding to the VPN name.

Step 407: Delete the VPC which a VPC delete request requests deleting.

Step 408: The DC breakout gateway deletes the first VPN instance and instructs the network side PE to delete the upper layer VPN instance.

In the Embodiment 3 and Embodiment 4 of the present invention, in step 306 and step 406, the LDP protocol or the BGP protocol may be used to bear the configuration request information.

Figure 7:
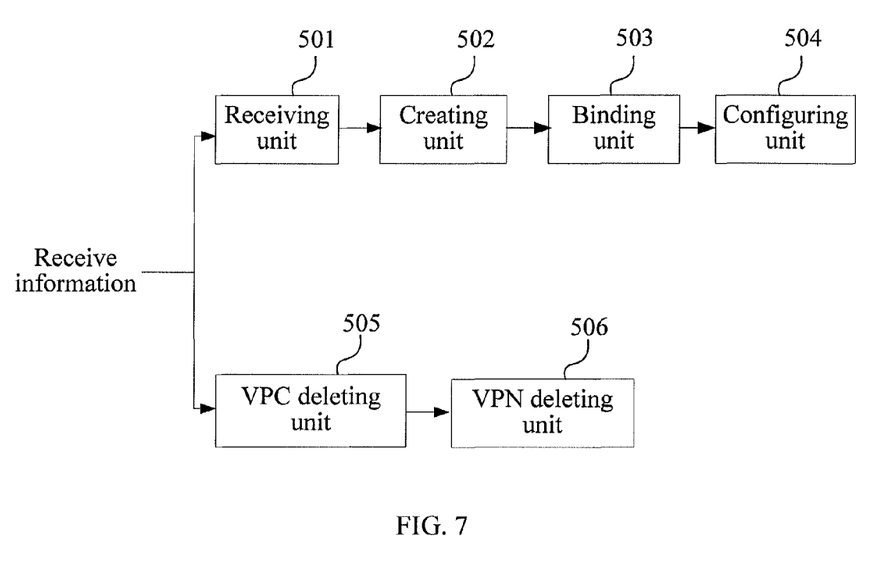
FIG. 7 is a schematic diagram of an apparatus for accessing a virtual private network by a virtual private cloud according to an Embodiment 5 of the present invention.

FIG. 7 is a schematic diagram of an apparatus for accessing a virtual private network by a virtual private cloud according to an Embodiment 5 of the present invention. As shown in FIG. 7, the apparatus includes the following content.

A receiving unit 501 is adapted to receive first configuration information, where the first configuration information includes parameter information of the virtual private cloud (VPC), identifier information of the virtual private network (VPN), and address information of a network side provider edge (PE).

Preferably, the first configuration information is sent by a cloud manager.

A creating unit 502 is adapted to create a first VPN instance according to the identifier information of the VPN.

After the receiving unit 501 receives the first configuration information, the creating unit 502 creates the first VPN instance according to the identifier information of the VPN.

Preferably, the first VPN instance is created by a VPN instance proxy in the apparatus.

A binding unit 503 is adapted to determine the VPC according to the parameter information of the VPC, and bind the VPC to the first VPN instance.

Preferably, after the apparatus receives the first configuration information, the creating unit 502 further creates a subinterface, and the binding unit 503 binds the VPC to the first VPN instance through the subinterface.

A configuring unit 504 is adapted to send second configuration information to the network side PE according to the address information of the network side PE, where the second configuration information includes the identifier information of the VPN, so that the network side PE configures an upper layer VPN instance for the first VPN instance on the network side PE according to the identifier information of the VPN.

Preferably, as regard a virtual private local area network service (VPLS), the identifier information of the VPN is a virtual switching instance (VSI ID). Preferably, as regard the layer 3 (L3) VPN, the identifier information of the VPN is a VPN route target (RT).

Preferably, the address information of the network side PE is a loopback (loopback) address of the network side PE.

Preferably, the upper layer VPN instance forwards a VPN packet received from another PE except a DC breakout gateway where the first VPN is located to the first VPN instance.

Preferably, the apparatus further includes: a VPC deleting unit 505, adapted to receive deletion information for the VPC and delete the VPC.

Preferably, the apparatus further includes a VPN deleting unit 506, adapted to delete the first VPN instance and instruct the network side PE to cancel configuration of the upper layer VPN instance.

Preferably, the apparatus is a DC breakout gateway.

An embodiment of the present invention also provides a network system. The system implants the method for accessing a virtual private network by a virtual private cloud, includes an apparatus for accessing a virtual private network by a virtual private cloud, and further includes a network side provider edge (PE). The network side PE is adapted to configure an upper layer VPN instance for a first VPN instance on the network side PE according to identifier information of the VPN; and the upper layer VPN instance forwards a VPN packet received from another PE except a DC breakout gateway where the first VPN is located to the first VPN instance. As regard VPLS access, the operation of configuring, by the network side PE, an upper layer VPN instance for the first VPN instance on the network side PE according to the identifier information of the VPN is specifically configuring the DC breakout gateway where the first VPN is located as a lower layer PE according to an IP address of a gateway where the first VPN is located and VSI ID information, so that the upper layer VPN instance is configured successfully. As regard layer 3 virtual private network access, the operation of configuring, by the network side PE, an upper layer VPN instance for the first VPN instance on the network side PE according to the identifier information of the VPN is specifically creating the upper layer VPN instance on the network side PE according to the VPN RT, and delivering a default route of the upper layer VPN instance to the DC breakout gateway where the first VPN is located, where the network side PE is a Multiprotocol Boarder Gateway Protocol (MP-BGP) peer of the DC breakout gateway where the first VPN is located. The network system for accessing a virtual private network by a virtual private cloud provided in this embodiment of the present invention implements automatic access of the VPC to the VPN corresponding to the identifier information of the VPN. Therefore, the access requires no manual configuration, reducing a large number of time cost and economic cost. Therefore, the network system for accessing a virtual private network by a virtual private cloud provided in this embodiment of the present invention also falls within the protection scope of the present application.

Those skilled in the art may further understand that the technical solutions of the present invention may be implemented in the form of electronic hardware, computer software, or integration of the hardware and software by combining the exemplary units and algorithm steps described in the embodiments of the present invention. To clearly describe the exchangeability of the hardware and software, the above description has generally described the constitution and steps of each embodiment by function. Whether the functions are implemented in hardware or software depends on specific application and designed limitations of the technical solutions. Those skilled in the art may use different methods to implement the functions in the case of the specific applications. However, this implementation shall not be considered going beyond the scope of the present invention.

The steps of the method or algorithms according to the embodiments of the present invention can be executed by the hardware or software module enabled by the processor, or executed by a combination thereof. The software module may be configured in a random access memory (RAM), a memory, a read-only memory (ROM), electrically programmable ROM, electrically erasable programmable ROM, a register, a hard disk, a movable hard disk, a CD-ROM, or any other form of storage mediums.

The above embodiments describe in detail the objectives, technical solutions, and beneficial effects of the present invention. It should be understood that these embodiments are for illustration purpose only, but the protection scope of the present invention is not limited thereto. Any modification, equivalent replacement, and improvement made without departing from the principle of the present invention shall fall into the protection scope of the invention.

What is claimed is:

1. A method for accessing a virtual private network by a virtual private cloud, comprising:
    receiving, by a data center (DC) breakout gateway, first configuration information, wherein the first configuration information comprises parameter information of the virtual private cloud (VPC), identifier information of the virtual private network (VPN), and address information of a network side provider edge (PE);
    creating, by the DC breakout gateway, a first VPN instance according to the identifier information of the VPN;
    determining, by the DC breakout gateway, the VPC according to the parameter information of the VPC, and binding the VPC to the first VPN instance; and
    sending, by the DC breakout gateway, second configuration information to the network side PE according to the address information of the network side PE, wherein the second configuration information comprises the identifier information of the VPN, so that the network side PE configures an upper layer VPN instance for the first VPN instance on the network side PE according to the identifier information of the VPN.

2. The method for accessing a virtual private network by a virtual private cloud according to claim 1, wherein the identifier information of the VPN is a virtual switching instance identifier (VSI ID) or a VPN route target (RT); and the address information of the network side PE is a loopback address of the network side PE.

3. The method for accessing a virtual private network by a virtual private cloud according to claim 1, wherein the upper layer VPN instance forwards a VPN packet to the first VPN instance, and the VPN packet is received from another PE except the DC breakout gateway where the first VPN instance is located.

4. The method for accessing a virtual private network by a virtual private cloud according to claim 2, wherein the configuring, by the network side PE, the upper layer VPN instance for the first VPN instance on the network side PE according to the identifier information of the VPN comprises:
    configuring, by the network side PE, the upper layer VPN instance on the network side PE according to the VSI ID;
    or
    creating, by the network side PE, the upper layer VPN instance on the network side PE according to the VPN RT, and delivering a default route of the upper layer VPN instance to the DC breakout gateway where the first VPN is located, wherein the network side PE is a Multiprotocol Boarder Gateway Protocol (MP-BGP) peer of the DC breakout gateway where the first VPN is located.

5. The method for accessing a virtual private network by a virtual private cloud according to claim 1, wherein the first configuration information is sent by a cloud manager.

6. The method for accessing a virtual private network by a virtual private cloud according to claim 1, further comprising: receiving, by the DC breakout gateway, deletion information for the VPC and deleting the VPC.

7. The method for accessing a virtual private network by a virtual private cloud according to claim 6, further comprising:
    deleting, by the DC breakout gateway, the first VPN instance; and
    instructing, by the DC breakout gateway, the network side PE to cancel configuration of the upper layer VPN instance.

8. An apparatus for accessing a virtual private network by a virtual private cloud, comprising:
    a receiving unit, configured to receive first configuration information, wherein the first configuration information comprises parameter information of the virtual private cloud (VPC), identifier information of the virtual private network (VPN), and address information of a network side provider edge (PE);
    a creating unit, configured to create a first VPN instance according to the identifier information of the VPN;
    a binding unit, configured to determine the VPC according to the parameter information of the VPC, and bind the VPC to the first VPN instance; and
    a configuring unit, configured to send second configuration information to the network side PE according to the address information of the network side PE, wherein the second configuration information comprises the identifier information of the VPN, so that the network side PE configures an upper layer VPN instance for the first VPN instance on the network side PE according to the identifier information of the VPN.

9. The apparatus for accessing a virtual private network by a virtual private cloud according to claim 8, wherein the identifier information of the VPN is a virtual switching instance ID or a VPN route target (RT); and the address information of the network side PE is a loopback address of the network side PE.

10. The apparatus for accessing a virtual private network by a virtual private cloud according to claim 8, wherein the first configuration information is sent by a cloud manager.

11. The apparatus for accessing a virtual private network by a virtual private cloud according to claim 8, further comprising:
a VPC deleting unit, configured to receive deletion information for the VPC and delete the VPC.

12. The apparatus for accessing a virtual private network by a virtual private cloud according to claim 8, further comprising:
a VPN deleting unit, configured to delete the first VPN instance and instruct the network side PE to cancel configuration of the upper layer VPN instance.

13. A network system, comprising the apparatus for accessing a virtual private network by a virtual private cloud according to claim 8.

14. The system according to claim 13, further comprising the network side PE, wherein the network side PE is configured to configure the upper layer VPN instance for the first VPN instance on the network side PE according to the identifier information of the VPN, and the upper layer VPN instance forwards a VPN packet to the first VPN instance, wherein the VPN packet is received from another PE except the DC breakout gateway where the first VPN is located.

15. The system according to claim 13, wherein the network side PE is further configured to:
configure the upper layer VPN instance on the network side PE according to a virtual switching instance (VSI ID), wherein the identifier information of the VPN is the VSI ID;

or create the upper layer VPN instance on the network side PE according to a VPN route target (RT), and deliver a default route of the upper layer VPN instance to the DC breakout gateway where the first VPN is located, wherein the network side PE is a Multiprotocol Boarder Gateway Protocol (MP-BGP) peer of the DC breakout gateway where the first VPN is located, and the identifier information of the VPN is the VPN RT.

\* \* \* \* \*